US008867393B2

(12) United States Patent
Chun et al.

(10) Patent No.: US 8,867,393 B2
(45) Date of Patent: Oct. 21, 2014

(54) METHOD AND APPARATUS FOR ALLOCATING A SOUNDING CHANNEL IN A WIRELESS COMMUNICATION SYSTEM

(75) Inventors: Jin Young Chun, Anyang-si (KR); Jin Soo Choi, Anyang-si (KR); Jin Sam Kwak, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 13/513,838

(22) PCT Filed: Dec. 16, 2010

(86) PCT No.: PCT/KR2010/009024
§ 371 (c)(1),
(2), (4) Date: Jun. 4, 2012

(87) PCT Pub. No.: WO2011/074895
PCT Pub. Date: Jun. 23, 2011

(65) Prior Publication Data
US 2013/0070623 A1    Mar. 21, 2013

Related U.S. Application Data

(60) Provisional application No. 61/287,710, filed on Dec. 18, 2009, provisional application No. 61/313,086, filed on Mar. 11, 2010, provisional application No. 61/313,789, filed on Mar. 14, 2010, provisional application No. 61/328,605, filed on Apr. 27, 2010.

(30) Foreign Application Priority Data

Dec. 15, 2010 (KR) .................. 10-2010-0128240

(51) Int. Cl.
H04L 12/26    (2006.01)
H04W 72/04   (2009.01)
H04L 5/00    (2006.01)
H04J 1/00    (2006.01)

(52) U.S. Cl.
CPC ............. *H04W 72/04* (2013.01); *H04L 5/0007* (2013.01); *H04J 1/00* (2013.01); *H04L 5/0048* (2013.01)
USPC .......................................................... 370/252

(58) Field of Classification Search
USPC ................. 370/230, 235, 228, 229, 252, 329
See application file for complete search history.

(56) References Cited

U.S. PATENT DOCUMENTS 8,059,554 B2 * 11/2011 Lee et al. ....................... 370/252
8,179,824 B2 *  5/2012 Seong et al. .................. 370/281
8,301,148 B2 * 10/2012 Yang et al. .................... 455/438
2012/0302246 A1 * 11/2012 Yang et al. .................... 455/438

FOREIGN PATENT DOCUMENTS

KR   10-2008-0073191    8/2008
KR   10-2008-0097615   11/2008
KR   10-2009-0022554    3/2009

* cited by examiner

*Primary Examiner* — Hassan Kizou
*Assistant Examiner* — Abdullahi Ahmed
(74) *Attorney, Agent, or Firm* — Mckenna Long & Aldridge LLP

(57) ABSTRACT

There are provided a method and apparatus for allocating a sounding channel in a wireless communication system. A base station transmits a first sounding channel allocation data to allocate a first sounding channel for a first system to a first zone, and transmits a second sounding channel allocation data to allocate a second sounding channel for a second system other than the first system to a second zone. The first zone and the second zone are multiplexed by an FDM (Frequency Division Multiplexing) method, and the first sounding channel and the second sounding channel are allocated to a same OFDMA (Orthogonal Frequency Division Multiple Access) symbol. A channel response can be estimated accurately when a terminal for IEEE (Institute of Electrical and Electronics Engineers) 802.16m system and a terminal for IEEE 802.16e system coexist in a legacy support mode.

8 Claims, 11 Drawing Sheets

METHOD AND APPARATUS FOR ALLOCATING A SOUNDING CHANNEL IN A WIRELESS COMMUNICATION SYSTEM

This application is a 35 U.S.C. §371 National Stage entry of International Application No. PCT/KR2010/009024, filed on Dec. 16, 2010, and claims the benefit of U.S. Provisional Application Nos. 61/287,710, filed Dec. 18, 2009, 61/313,086, filed Mar. 11, 2010, 61/313,789, filed Mar. 14, 2010, 61/328,605, filed Apr. 27, 2010, and Korean Patent Application No. 10-2010-0128240, filed Dec. 15, 2010, all of which are incorporated by reference in their entirety herein.

BACKGROUND OF THE INVENTION

1. Field of the Invention

The present invention relates to wireless communication and, more particularly, to a method and apparatus for allocating a sounding channel in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A control channel may be used to transmit various types of control signals for communication between a base station and a mobile station. An uplink control channel for the IEEE 802.16m system may include a fast feedback channel (FFBCH), a hybrid automatic repeat request (HARQ) feedback channel (HFBCH0, a sounding channel, a ranging channel, a bandwidth request channel (BRCH), and so on. Among uplink control channels of an IEEE 802.16m system, a sounding channel may be used by a base station (BS) to determine an uplink channel response for the purpose of an uplink closed-loop (CL) multiple-input multiple-output (MIMO) transmission and uplink scheduling. A terminal (or a mobile station (MS)) may transmit a sounding signal through a sounding channel, and the BS estimates a channel response based on the received sounding signal. In a time division duplex (TDD) system, the BS may use an estimated uplink channel response in order to perform a downlink (DL) CL MIMO transmission. Accordingly, a performance gain (or throughput), coverage, and link reliability can be enhanced.

Meanwhile, the IEEE 802.16m system has backward compatibility, so, it can support a terminal supporting an IEEE 802.16e system as well as a terminal supporting the IEEE 802.16m system. A case in which the IEEE 802.16m system supports a 802.16e terminal may be called a legacy support mode.

A method for effectively allocating a sounding channel in the legacy support mode is required.

SUMMARY OF THE INVENTION

The present invention provides a method and apparatus for allocating a sounding channel in a wireless communication system.

In an aspect, a method for allocating a sounding channel in a wireless communication system is provided. The method includes allocating a first sounding channel for a first system to a first zone by transmitting first sounding channel allocation information, and allocating a second sounding channel for a second system different from the first system to a second zone by transmitting second sounding channel allocation information, wherein the first and second zones are multiplexed in a frequency division multiplexing (FDM) manner, and the first sounding channel and the second sounding channel are allocated to the same orthogonal frequency division multiple access (OFDMA) symbol.

The OFDMA symbol to which the first sounding channel and the second sounding channel may be allocated is a first OFDMA symbol of an uplink subframe.

The first sounding channel and the second sounding channel may be allocated by sounding subband unit. The sounding subband unit may include 72 contiguous subcarriers. The first sounding channel and the second sounding channel may not overlap in a frequency domain.

The first system may be an institute of electrical and electronics engineers (IEEE) 802.16e system, and the second system may be an IEEE 802.16m system.

The first sounding channel allocation information may be UL_Sounding_Command_IE, and the second sounding channel allocation information may be UL Sounding Command A-MAP IE. The UL_Sounding_Command_IE may indicate a region to which the first sounding channel is allocated in the first zone, and the UL Sounding Command A-MAP IE may indicate a region to which the second sounding channel is allocated in the second zone.

The method may further include receiving sounding signals from the first sounding channel and the second sounding channel, respectively, and measuring a channel response based on the received sounding signals.

In another aspect, an apparatus for allocating a sounding channel in a wireless communication system is provided. The apparatus includes a radio frequency (RF) unit configured to transmit or receive a radio signal, and a processor connected to the RF unit, wherein the processor is configured to allocate a first sounding channel for a first system to a first zone by transmitting first sounding channel allocation information, and allocate a second sounding channel for a second system different from the first system to a second zone by transmitting second sounding channel allocation information, wherein the first and second zones are multiplexed in a frequency division multiplexing (FDM) manner, and the first sounding channel and the second sounding channel are allocated to the same orthogonal frequency division multiple access (OFDMA) symbol.

In another aspect, a method for measuring a channel response in a wireless communication system is provided. The method includes allocating a first sounding channel, by a base station, by transmitting first sounding channel allocation information to a first terminal, allocating a second sounding channel, by the base station, by transmitting second sounding channel allocation information to a second terminal, transmitting a sounding signal, by the first and second terminals, to the base station through the first and second sounding channels, respectively, and measuring, by the base station, a channel response based on the received sounding signals, wherein the first and second sounding channels are allocated to the same orthogonal frequency division multiple access (OFDMA) in a time domain.

The OFDMA symbol to which the first sounding channel and the second sounding channel are allocated may be a first OFDMA symbol of an uplink subframe.

The first sounding channel and the second sounding channel may be allocated by sounding subband unit, and the sounding subband unit includes 72 contiguous subcarriers. The first sounding channel and the second sounding channel may not overlap in a frequency domain.

The first sounding channel allocation information may be UL_Sounding_Command_IE, and the second sounding channel allocation information may be UL Sounding Command A-MAP IE.

According to embodiments of the present invention, when a terminal for an IEEE 802.16m system and a terminal for an IEEE 802.16e system coexist in a legacy support mode, a channel response can be accurately estimated.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
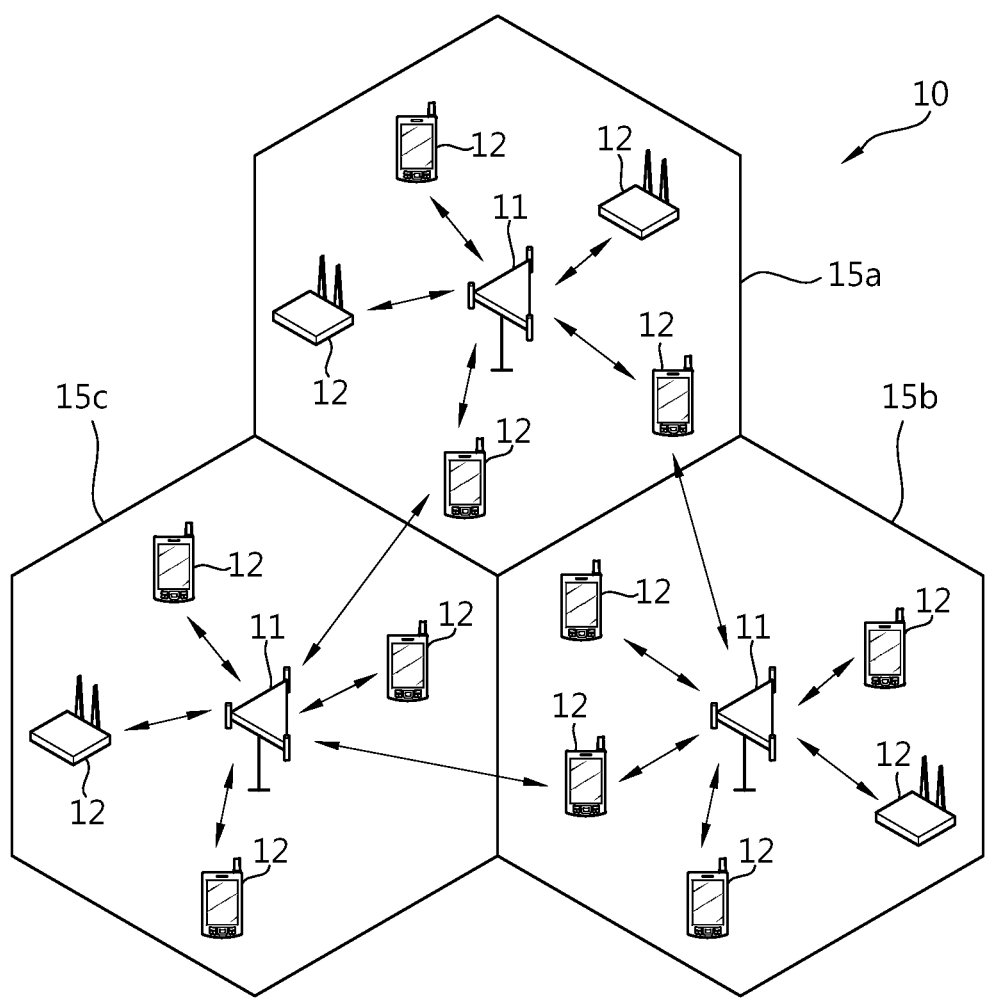
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
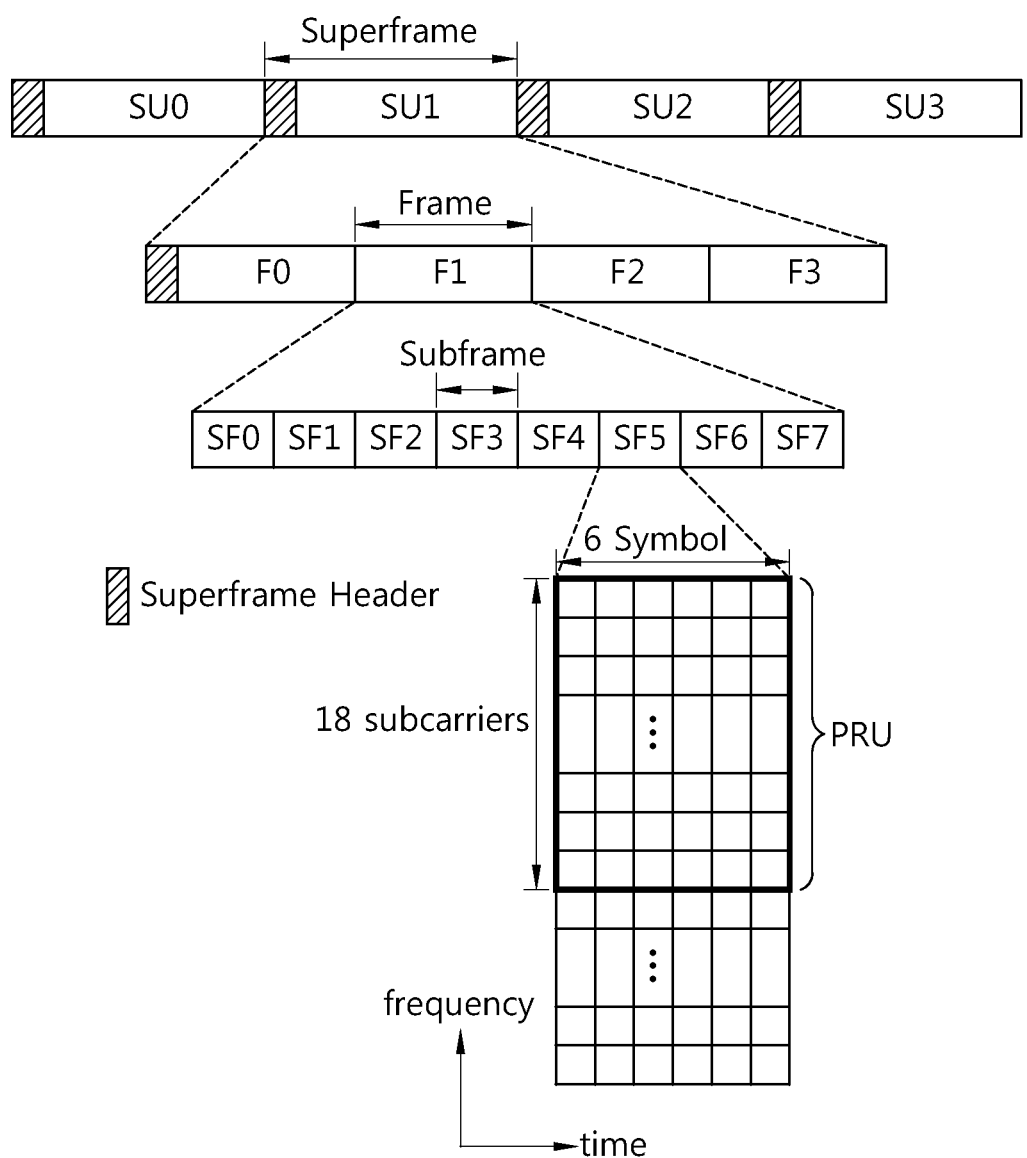
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | 5 | 7 | 8.75 | 10 | 20 |
|---|---|---|---|---|---|---|
| Sampling factor, n | | 28/25 | 8/7 | 8/7 | 28/25 | 28/25 |
| Sampling frequency, Fs(MHz) | | 5.6 | 8 | 10 | 11.2 | 22.4 |
| FFT size, $N_{FFT}$ | | 512 | 1024 | 1024 | 1024 | 2048 |
| Subcarrier spacing, Δf(kHz) | | 10.94 | 7.81 | 9.77 | 10.94 | 10.94 |
| Useful symbol time, Tb(μs) | | 91.4 | 128 | 102.4 | 91.4 | 91.4 |
| G = 1/8  Symbol time, Ts(μs) | | 102.857 | 144 | 115.2 | 102.857 | 102.857 |
| FDD | Number of OFDMA symbols per 5 ms frame | 48 | 34 | 43 | 48 | 48 |
|  | Idle time(μs) | 62.857 | 104 | 46.40 | 62.857 | 62.857 |
| TDD | Number of OFDMA symbols per 5 ms frame | 47 | 33 | 42 | 47 | 47 |
|  | TTG + RTG(μs) | 165.714 | 248 | 161.6 | 165.714 | 165.714 |
| G = 1/16  Symbol time, Ts(μs) | | 97.143 | 136 | 108.8 | 97.143 | 97.143 |
| FDD | Number of OFDMA symbols per 5 ms frame | 51 | 36 | 45 | 51 | 51 |
|  | Idle time(μs) | 45.71 | 104 | 104 | 45.71 | 45.71 |
| TDD | Number of OFDMA symbols per 5 ms frame | 50 | 35 | 44 | 50 | 50 |
|  | TTG + RTG(μs) | 142.853 | 240 | 212.8 | 142.853 | 142.853 |
| G = 1/4  Symbol time, Ts(μs) | | 114.286 | 160 | 128 | 114.286 | 114.286 |
| FDD | Number of OFDMA symbols per 5 ms frame | 43 | 31 | 39 | 43 | 43 |
|  | Idle time(μs) | 85.694 | 40 | 8 | 85.694 | 85.694 |
| TDD | Number of OFDMA symbols per 5 ms frame | 42 | 30 | 38 | 42 | 42 |
|  | TTG + RTG(μs) | 199.98 | 200 | 136 | 199.98 | 199.98 |
| Number of Guard subcarriers | Left | 40 | 80 | 80 | 80 | 160 |
|  | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ denotes a smallest power of 2 greater than $N_{used}$.
A sampling factor is defined as $F_s$ = floor(n · BW/8000) × 8000.
A subcarrier spacing is defined as Δf = $F_s$/NFFT.
A useful symbol time is defined as Tb = 1/Δf.
A CP time is defined as Tg = G · Tb.
An OFDMA symbol time is defined as Ts = Tb + Tg.
A sampling time is defined as Tb/NFFT.

Figure 3:
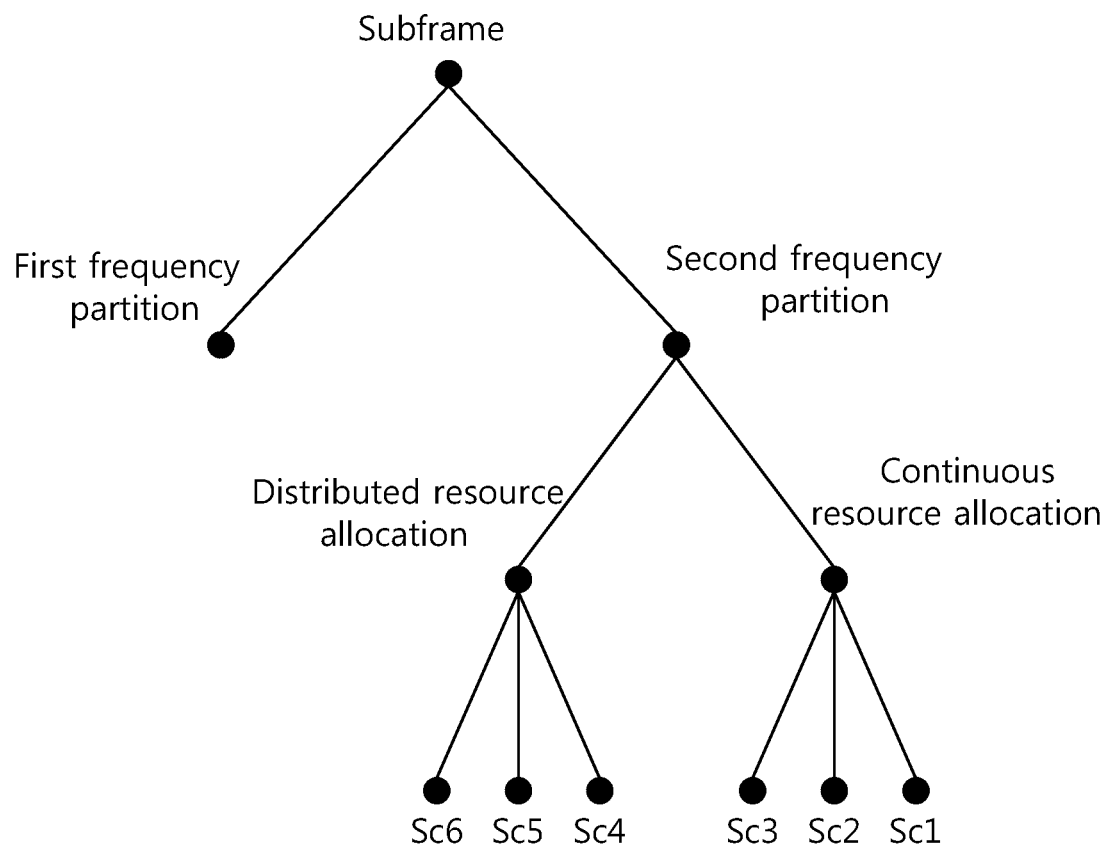
FIG. 3 shows an example of an uplink resource structure.

FIG. 3 shows an example of an uplink resource structure.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed RRUs. Each frequency partition may be used for other purposes such as fractional frequency reuse (FFR). The FP2 of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be a tile. An uplink DLRU may include a group of subcarriers distributed from 3 tiles. The tile may be defined as 6 subcarriers and Nsym OFMDA symbols.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

When a plurality of cells exists, an uplink resource may be mapped by performing various processes such as subband partitioning, miniband permutation, frequency partitioning, etc. Such a process can be called a subchannelization process.

Figure 4:
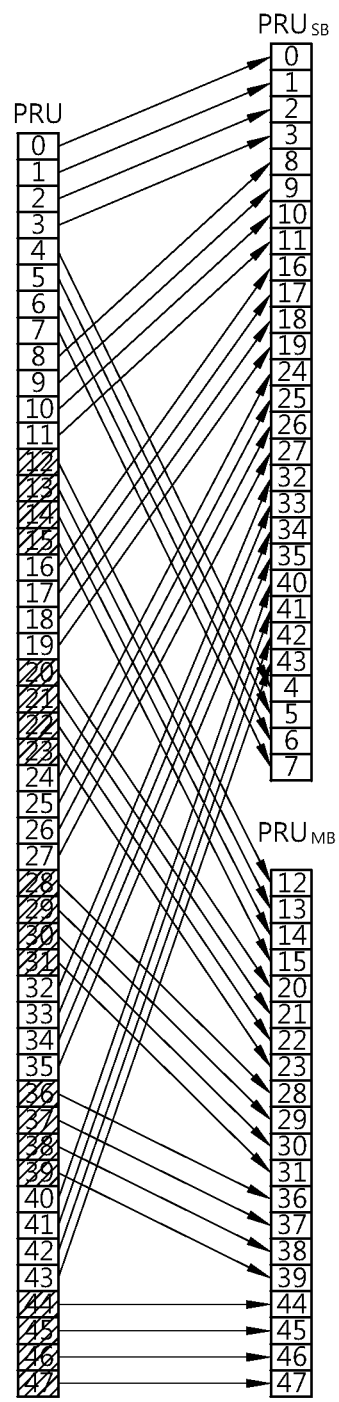
FIG. 4 shows an example of a subband partitioning process.

FIG. 4 shows an example of a subband partitioning process. A bandwidth of 10 MHz is used in the subband partitioning process of FIG. 4.

A plurality of PRUs is divided into a subband (SB) and a miniband (MB). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. $K_{SB}$ may be determined by an uplink subband allocation count (USAC). A length of the USAC may be 3 to 5 bits, and may be broadcast through the SFH, etc. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The total number of PRUs is $N_{PRU}=L_{SB}+L_{MB}$.

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}-1$). PRUs in the $PRU_{MB}$ are respectively indexed from 0 to ($L_{MB}-1$). In addition, the $PRU_{MB}$ is mapped to a permutation PRU ($PPRU_{MB}$) in a miniband permutation process. The $PRU_{SB}$ and the $PPRU_{MB}$ are mapped to at least one frequency partition in a frequency partitioning process.

Hereinafter, a legacy support mode supporting a terminal belonging to an IEEE 802.16e system (referred to as a '16e terminal'), as well as a terminal belonging to an IEEE 802.16m system (referred to as a '16m terminal', hereinafter), will be described. Also, hereinafter, the IEEE 802.16m system may be called an advanced air interface (AAI) system and the IEEE 802.16e system may be called a WirelessMAN-OFDA system or a legacy system.

Figure 5:
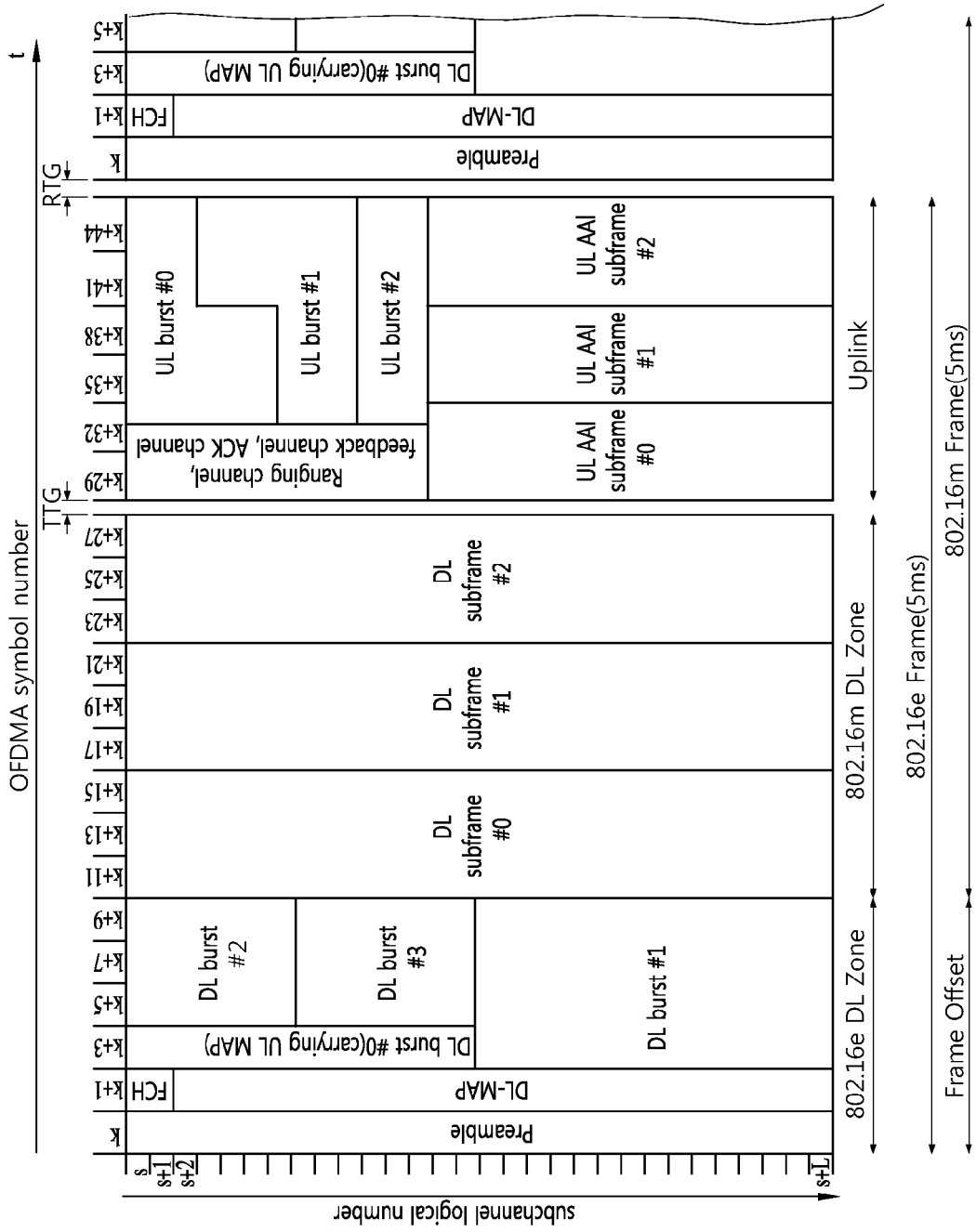
FIG. 5 shows another example of a frame structure.

FIG. 5 shows another example of a frame structure. The frame structure of FIG. 5 represents a TDD frame structure that supports UL partially used subcarrier (PUSC) permutation in the legacy support mode and a legacy zone and an AAI zone are multiplexed in an frequency division multiplexing (FDM) manner in uplink.

With reference to FIG. 5, a frame includes downlink (DL) subframes and uplink (UL) subframes. The DL subframes are temporally ahead of the UL subframes. The DL subframes start from a preamble, an frame control header (FCH), a DL-MAP, a UL-MAP, and a burst region in order. The UL subframes include UL control channels such as a ranging channel, a feedback channel, and the like, a burst region, and the like. A guard time for discriminating the DL subframes and UL subframes is inserted into a middle portion (between a DL subframe and a UL subframe) and a final portion (next to an uplink subframe) of the frame. A transmit/receive transition gap (TTG) is a gap between a DL burst and a subsequent UL burst. An receive/transmit transition gap (RTG) is a gap between a UL burst and a subsequent DL burst. The DL region and the UL region are divided into a region for the 16e terminal and a region for the 16m terminal, respectively. In the DL region, the preamble, FCH, DL-MAP, UL-MAP, and DL burst region are regions for the 16e terminal, and the other remaining DL regions are regions for the 16m terminal. In the UL region, the uplink control channel and uplink burst region are regions for the 16e terminal, and the other remaining UL regions are regions for the 16m terminal. In the UL region, the regions for the 16e terminal and the regions for the 16m terminal may be multiplexed in various manners. In FIG. 5, the UL regions are multiplexed in an FDM manner, but the present invention is not limited thereto and the UL regions may be multiplexed in a time division multiplexing (TDM) manner.

When the legacy zone and the AAI zone are multiplexed in the FDM manner in uplink, a subcarrier group including a plurality of subcarriers, namely, subchannels, is allocated to one or more legacy zones. Other subchannels including a plurality of the other remaining subcarriers form UL subframes and are allocated to the AAI zone. When a bandwidth is one of 5, 7, 10 and 20 MHz, every UL subframe is a type-1 subframe. Namely, it includes six OFDMA symbols. When a bandwidth is 8.75 MHz, a first UL subframe is a type-1 subframe, and the other remaining subframes are type-4 subframes. Control channels and bursts for the terminals may be scheduled within a subchannel of the legacy zone or a subchannel of the AAI zone according to a mode in which the terminals are connected to a base station (BS). However, the subchannel of the legacy zone and the sub-channel of the AAI zone are not scheduled within the same frame. Meanwhile, in FIG. 5, the legacy zone and the AAI zone are multiplexed in the FDM manner, but this means that the legacy zone and the AAI zone are multiplexed in the FDM manner on a logical subchannel index, and they may coexist in a frequency domain on a physical subchannel index.

The preamble is used for an initial synchronization between a BS and a terminal, cell searching, a frequency offset, and a channel estimation. The FCH includes a length of a DL-MAP message and information regarding a coding scheme of the DL-MAP. The DL-MAP is a region in which the DL-MAP message is transmitted. The DL-MAP message defines an access to a DL channel. This means that the DL-MAP message defines indication and/or control information regarding a DL channel. The DL-MAP message includes a configuration change count of a downlink channel descriptor (DCD) and a BS identifier (ID). The DCD describes a DL burst profile applied to a current map. The DL burst profile refers to characteristics of a DL physical channel, and the DCD is periodically transmitted by a BS through a DCD message. The UL-MAP is a region in which a UL-MAP message is transmitted. The UL-MAP message defines an access to a UL channel. This means that the UL-MAP message defines indication and/or control information regarding an uplink channel. The UL-MAP message includes a configuration change count of an uplink channel descriptor (UCD), a valid start time of an uplink allocation defined by the UL-MAP. The UCD describes an uplink burst profile. The uplink burst profile refers to characteristics of an uplink physical channel, and the UCD is periodically transmitted by a BS through a UCD message. The DL burst is a region in which data from a BS to a terminal is transmitted, and the UL burst is a region in which data from a terminal to the BS is transmitted. A fast feedback region is included in the UL burst region of the OFDM frame. The fast feedback region is used to transmit information which requires a fast response. The fast feedback region may be used to transmit CQI. The position of the fast feedback region is determined by the UL-MAP. The position of the fast feedback region may be fixed or varied within an OFDM frame.

A novel symbol structure may be proposed in the legacy support mode. A plurality of subcarriers may be divided into $N_{g,left}$ number of left guard subcarriers, $N_{g,right}$ number of right guard subcarriers, and $N_{used}$ number of used subcarriers. The used subcarriers may be divided into a plurality of partial usage of subchannels (PUSC) tiles.

Figure 6:
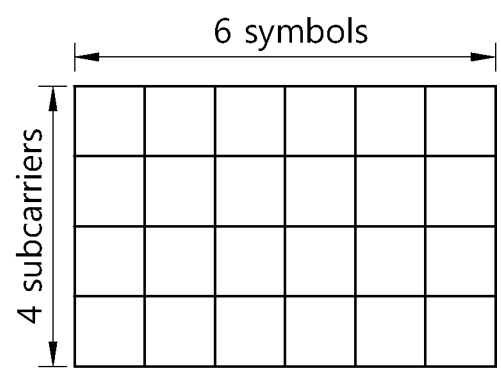
FIG. 6 shows an example of a tile structure of the AAI zone multiplexed with the legacy zone in the FDM manner in the legacy support mode.

FIG. 6 shows an example of a tile structure of the AAI zone multiplexed with the legacy zone in the FDM manner in the legacy support mode. Unlike a general tile structure, the tile illustrated in FIG. 6 may include four contiguous subcarriers and six OFDMA symbols. In the legacy support mode, a DLRU of the AAI zone may be comprised of six distributed tiles.

Meanwhile, in the legacy zone, a subchannel, a basic allocation unit of resource, is comprised of six distributed tiles, and a single tile is comprised of four contiguous subcarriers and three OFDMA symbols. A position of the DLRU or the subchannel on a frequency axis is determined according to a PUSC permutation rule of the legacy system.

Hereinafter, a sounding channel of the legacy system and the AAI system will be described.

A sounding channel in the legacy system is configured as follows. This may be referred to paragraph 8.4.6.2.7.1 of IEEE Std 802.16-2009 (Revision of IEEE std 802.16-2004).

In order to allocate a sounding zone to a frame, a BS may transmit PAPR_Reduction_Safety_Sounding_zone_allocation_IE on a UL-MAP. The sounding zone is a region which occupies one or more OFDMA symbols within a UL frame such that a terminal can transmit a sounding signal. The one or more OFDMA symbols allocated to the sounding zone may be positioned at the end of the corresponding permutation zone. The permutation zone is informed by UL_Zone_IE, and when there is no UL_Zone_IE, it operates in the PUSC mode. The BS may transmit UL_Sounding_Command_IE indicating that a terminal should transmit of a sounding signal in one or more OFDMA symbols within a sounding zone, on the UL-MAP. UL_Sounding_Command_IE may be classified into two types. A UL_Sounding_Command_IE type A indicates that the terminal should transmit a particular sounding signal at one or more symbol intervals within the sounding zone, and specifies a sounding frequency band occupied by a sounding signal within the OFDMA symbols. Though a UL_Sounding_Command_IE type B is similar to the UL_Sounding_Command_IE type A, a sounding frequency band is allocated according to DL subcarrier permutation.

A frequency domain of the OFDMA symbols to which the sounding zone is allocated may be divided into a plurality of sounding frequency bands which do not overlap. Each of the sounding frequency bands may include 18 contiguous subcarriers. For example, when a fast Fourier transform (FFT) size is 2048, the sounding zone may include a maximum $1728/18=96$ number of sounding frequency bands. 1728 is the number of subcarriers available when the FFT size is 2048. As the FFT size is changed, the number of sounding frequency bands may be varied. The BS may indicate a starting point of the sounding frequency band from which the sounding zone starts and a contiguously allocated region to the terminal by the UL_Sounding_Command_IE.

Or, the sounding frequency band may include 36 contiguous subcarriers. When the FFT sizes are 512, 1024, and 2048, respectively, the BS may group a plurality of sounding frequency bands into one band, two bands, and four bands to indicate a sounding frequency band to which the sounding zone is allocated to the terminal through a 12-bit bitmap. Or, the sounding zone may be allocated in units of PUSC.

The sounding channel of the AAI system is configured as follows. A sounding signal occupies a single OFDMA symbol of a UL subframe. A sounding symbol in which the sounding signal is transmitted may be a first OFDMA symbol of the UL subframe. Each UL subframe may include only a single sounding symbol. When a UL subframe is comprised of six OFDMA symbols, the other remaining five OFDMA symbols configure a PRU for a data transmission, and when a UL subframe is comprised of seven OFDMA symbols, the other remaining six OFDMA symbols configure a PRU for a data transmission. Eighteen contiguous subcarriers in a PRU may be used for sounding.

The BS may transmit a UL Sounding Command A-MAP IE requesting a transmission of a sounding signal from the terminal. Table 2 below shows an example of the UL Sounding Command A-MAP IE.

TABLE 2

| Syntax | Size (bit) | Notes |
|---|---|---|
| UL_Sounding_Command_A-Map_IE( ){ | — | — |
| A-Map IE type | 4 | UL Sounding Command A-MAP IE |
| Sounding AAI subframe | 2 | Indicates the sounding AAI subframe. AAI subframes with sounding symbol are renumbered in time starting from 0. |

TABLE 2-continued

| Syntax | Size (bit) | Notes |
|---|---|---|
| Sounding subband bitmap | variable max. 24 | FFT size dependant |
| If(multiplexingType==0){ | | multiplexingType is transmitted in AAI-SCD message |
| Decimation offset d | 5 | Unique decimation offset |
| }else{ | | |
| Cyclic time shift m | 5 | Unique cyclic shift |
| } | | |
| Periodicity (p) | 3 | 0b000 = Single command, not periodic, or terminate the periodicity. Otherwise, repeat sounding once peer s(p-1) frames, where p is decimal value of the periodicity field |
| Antenna switching | 1 | 0b0: Antenna switching 0b1: No antenna switching |
| Power boosting | 1 | 0b0: No power boosting 0b1: 3 dB power boosting |
| Padding | variable | Padding |
| } | | |

With reference to Table 2, a Sounding AAI subframe field indicates a UL subframe including a sounding symbol. A Sounding subband bitmap field is used to indicate a sounding subband in which a sounding signal is transmitted. Namely, in the AAI system, a sounding channel is configured by subband. Thus, a single sounding subband includes 72 (4*18=72) contiguous subcarriers, and a sounding channel is allocated to at least one sounding subband. The most significant bit (MSB) of the sounding subband bitmap field corresponds to a sounding subband having the smallest subcarrier index. Namely, when available subcarriers are divided into units of sounding subbands, starting from a subcarrier having a small index, so as to be indexed, the sounding subband bitmap field indicates a sounding subband allocated to the sounding channel by a bitmap. Meanwhile, the periodicity field indicates a transmission of a periodic sounding signal of a terminal. When the value of the periodicity field is 0, a transmission of a sounding signal is terminated by one time.

As described above, when the AAI zone and the legacy zone are multiplexed in the FDM manner, the unit of subbands is not 72 (4*18=72) subcarriers in the AAI zone and permutation is performed thereon according to the permutation rule of the legacy system, so the legacy zone and the AAI zone may be mixed in units of four subcarriers. Thus, when a sounding channel is allocated according to the sounding channel allocation method of the existing AAI system, a BS cannot accurately measure a channel response. Thus, a novel sounding channel allocation method is required.

Hereinafter, a sounding channel allocation method proposed for the case in which the AAI zone and the legacy zone are multiplexed in the FDM manner in the legacy support mode will be described through an embodiment as follows. In order to allocate a sound channel in the legacy support mode, various methods may be proposed.

1) A sounding channel is allocated to the AAI zone and the legacy zone, respectively, such that a sounding zone is allocated to the same OFDMA symbol in a time domain and a physical frequency band to which the sounding zone is allocated does not overlap in a frequency domain.

First, an allocation of a sounding channel in a time domain will be described. In the legacy system, a sounding channel is allocated to one or more last OFDMA symbols of a UL subframe, and in the AAI system, a sounding channel is allocated to a first OFDMA symbol of a UL subframe. The present invention proposes that a sounding channel of the AAI system and a sounding channel of the legacy system are allocated to the same OFDMA symbol. A sounding channel may be allocated to various OFDMA symbols. A sounding channel may be allocated to a third or sixth (last) OFDMA symbol of a subframe according to the legacy system, or may be allocated to the first OFDMA symbol of a subframe according to the AAI system.

Figure 7:
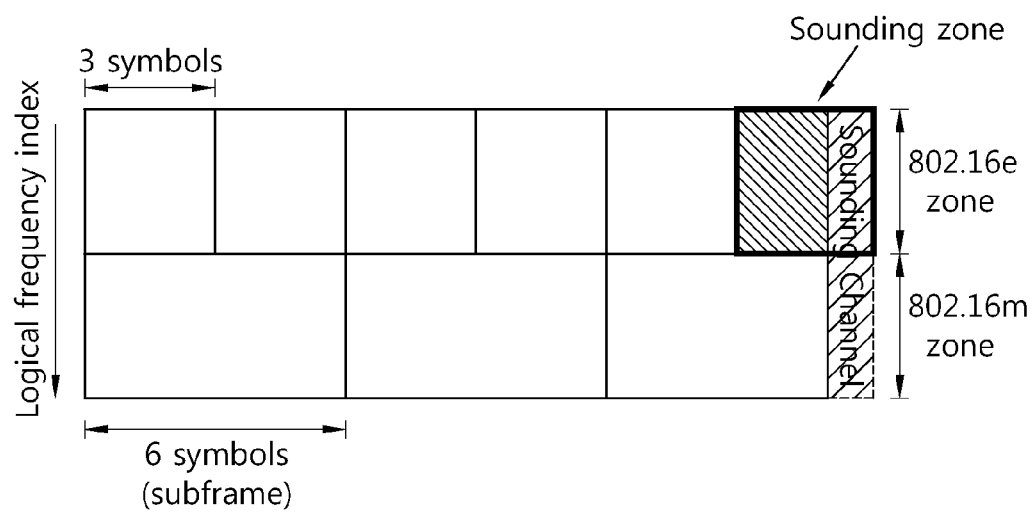
FIGS. 7 and 8 show an example of a configuration of a subframe to which a sounding channel is allocated according to the proposed invention.

FIG. 7 shows an example of a configuration of a subframe to which a sounding channel is allocated according to the proposed invention. With reference to FIG. 7, sounding channels of an AAI zone and a legacy zone are all allocated to the last OFDMA symbol. Here, in the AAI zone, the other remaining five OFDMA symbols, excluding the OFFDMA symbol to which a sounding channel is allocated, may be configured as type-3 subframes. However, the PUSC of the legacy zone includes three OFDMA symbol units, so the other remaining two OFDMA symbols, excluding the OFDMA symbol to which a sounding channel is allocated, may not be used for a burst transmission. Thus, a BS supporting the 16e terminal cannot allocate a UL bust to the corresponding region. Meanwhile, when a sounding channel is allocated to a subframe, rather than to the last subframe, a permutation zone in the legacy zone is required to be newly configured by UL_Zone_IE. Namely, up to a subframe to which the sounding channel is allocated may be set as a PUSC region, and subsequent subframes may be set as another PUSC region. Here, in order not to affect the permutation of the AAI zone, the AAI zone and the legacy zone may have the same PUSC permutation rule and Perm_Base.

Figure 8:
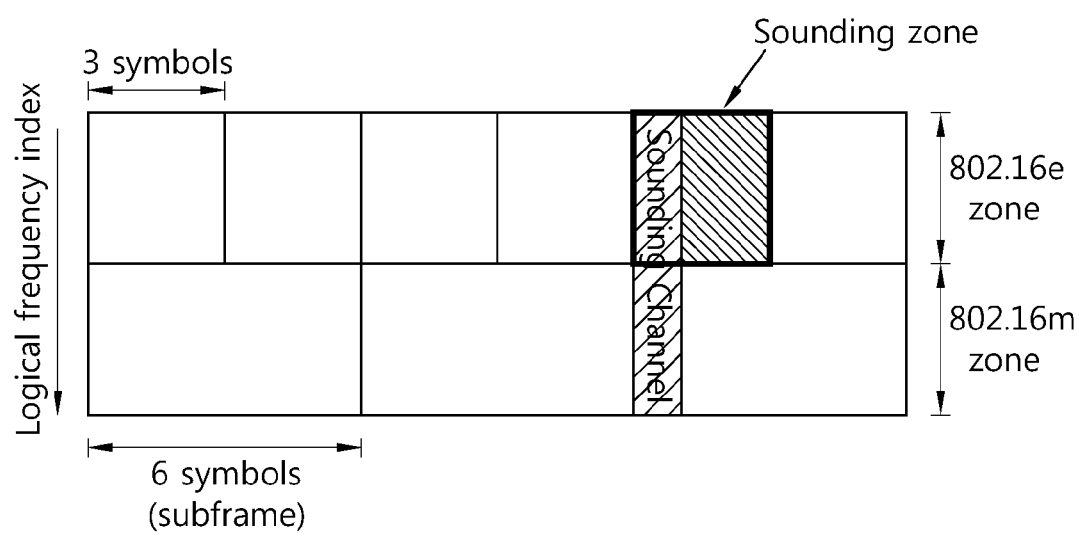

FIG. 8 shows another example of a configuration of a subframe to which a sounding channel is allocated according to a proposed invention. With reference to FIG. 8, sounding channels of the AAI zone and the legacy zone are allocated to the first OFDMA symbol of a subframe. To this end, the first OFDMA symbol of the subframe to which the sounding channel is allocated should be included in a sounding zone. The sounding zone is allocated to one or more last OFDMA symbols of the permutation zone in the legacy zone, so the BS may transmit UL_Zone_IE such that the last OFDMA symbol of the permutation zone and the first OFDMA symbol of a UL subframe of the AAI zone are conformed. Namely, the last three OFDMA symbols of the permutation zone are allocated to the sounding zone by the UL_Zone_IE, and only a first OFDMA symbol of the sounding zone is used to transmit a sounding signal. The other remaining two OFDMA symbols are not used for a burst transmission. Thus, in the existing AAI system, the sounding channel of the AAI zone and the sounding channel of the legacy zone can be transmitted in the same OFDMA symbol, without changing the OFDMA symbol in which the sounding channel is transmitted.

An allocation of a sounding channel in the frequency domain will be described. A subframe is allocated in units of four subcarriers according to a PUSC structure in the legacy support mode. Meanwhile, in the AAI system, the sounding channel is allocated by subband including 72 (4*18=72) contiguous subcarriers, and in the legacy system, the sounding channel is allocated in units of 18 contiguous subcarriers or 36 contiguous subcarriers. Namely, source allocation units of the sounding channel and the data transmission region are different, so a method for allocating a sounding channel to the frequency domain is required.

For example, the BS may allocate a sounding channel to the legacy zone and the 16e terminal may not transmit a sounding signal. Thus, a sounding channel of a full band sounding channel may be configured by using the UL Sounding Command A-MAP IE of the AAI system which is currently defined. Like the related art, a unit of constituting a sounding channel may be a sounding subband including 72 (4*18=72) subcarriers, or may be 24 subcarriers according to PUSC tiles.

Alternatively, a sounding channel may be allocated respectively by the UL_Sounding_Command_IE and the UL Sounding Command A-MAP IE currently defined with respect to the 16e terminal and the 16m terminal. However, a basic allocation unit of a sounding channel in the frequency domain is fixed to 72 (4*18=72) contiguous subcarriers. Thus, a sounding channel of the legacy zone is also allocated in units of 72 contiguous subcarriers. This is a case in which a sounding channel of a legacy zone is allocated in units of 36 contiguous subcarriers. However, when the size of FFT is 2048 and 36 contiguous subcarriers are bundled by every four subcarriers, a basic allocation unit of the sounding channel may be 144 (8*18=144) contiguous subcarriers. A sounding channel of the AAI system may be allocated to a region remaining after the sounding channel of the legacy system is allocated.

Figure 9:
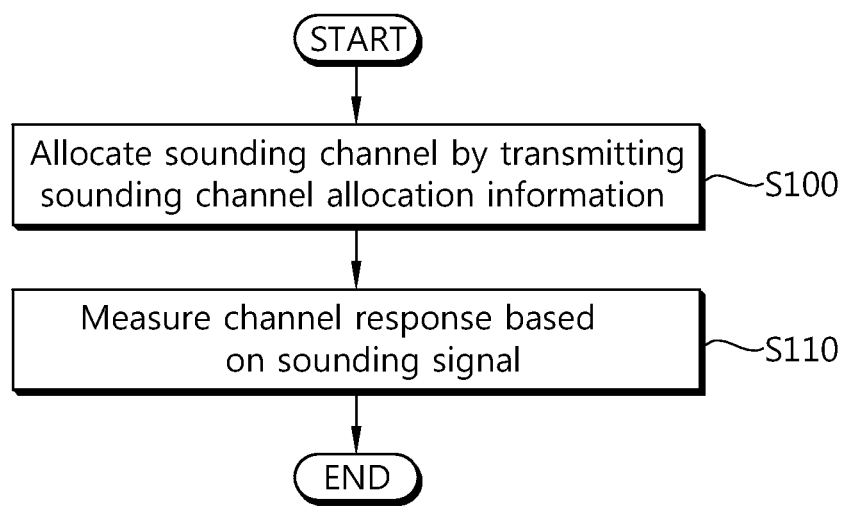
FIGS. 9 and 10 are a block diagram showing an embodiment of a proposed method for allocating a sounding channel.

FIG. 9 is a block diagram showing an embodiment of a proposed method for allocating a sounding channel.

In step S100, the BS allocates a sounding channel by allocating sounding channel allocation information to the 16e terminal and the 16m terminal, respectively. The sounding channel allocation information transmitted to the 16e terminal may be UL_Sounding_Command_IE transmitted on the UL-MAP, and the sounding channel allocation information transmitted to the 16m terminal may be UL Sounding Command A-MAP IE. Here, the sounding channel allocated to the legacy zone and the sounding channel allocated to the AAI zone are allocated to the same OFDMA symbol. In step S110, the BS receives the respective sounding signals transmitted from the 16e terminal and the 16m terminal and estimates a channel response.

Figure 10:
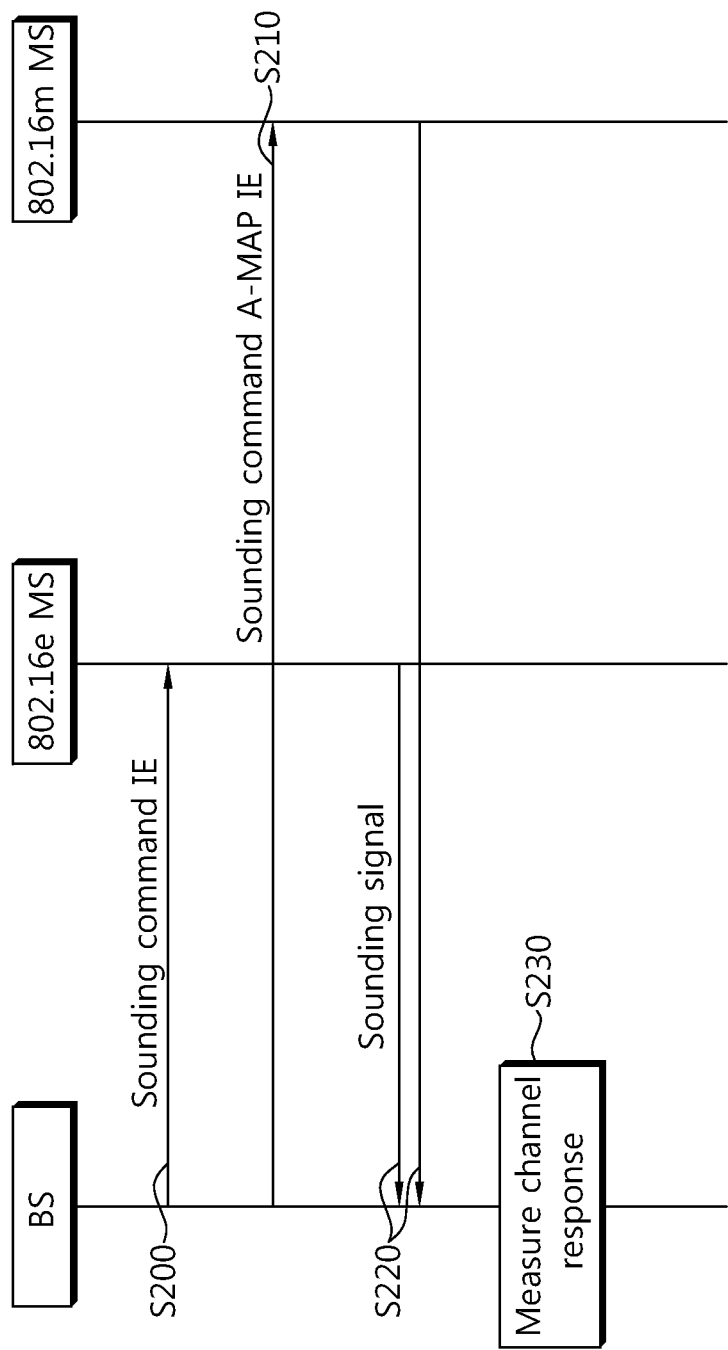

FIG. 10 is a block diagram showing another embodiment of a proposed method for allocating a sounding channel. In step S200, the BS allocates a sounding channel for the legacy zone by transmitting UL_Sounding_Command_IE to the 16e terminal. In step S210, the BS allocates a sounding channel for the AAI zone by transmitting UL Sounding Command A-MAP IE to the 16m terminal. The sounding channel for the legacy zone and the sounding channel for the AAI zone may be allocated to the same OFDMA symbol. In step S220, the 16e terminal and the 16m terminal transmit the sounding signal to the BS, respectively. In step S230, the BS measures a channel response based on the received sounding signals.

Meanwhile, when a region to which the legacy zone and the AAI zone have been allocated is known, the sounding channel of the legacy system and the sounding channel of the AAI system may be allocated such that they overlap in the frequency domain. In this case, however, the sounding signals may be transmitted only within the frequency domain to which the respective regions belong. For example, in case of 72 contiguous subcarriers including both the legacy zone and the AAI zone, the 16e terminal may transmit a sounding signal through a sounding channel within the legacy zone, and the 16m terminal may transmit a sounding signal through a sounding channel within the AAI zone, respectively.

Also, when the frequency domain is divided into sounding subband unit in the OFDMA symbol to which a sounding channel is allocated, the number of available subcarriers is calculated as the number of available subcarriers of the AAI system or the AMC mode of the legacy system. However, the number of used subcarriers actually used may be an existing value or the number of available subcarriers used to discriminate a sounding subband. When the existing value is used, although a sounding channel is allocated to subcarriers which do not correspond to the available subcarriers, a sounding signal is not transmitted thereto.

2) When the AAI zone and the legacy zone are multiplexed in the FDM manner in the legacy support mode, a sounding channel may be allocated in units of 24 subcarriers in a subframe of the AAI zone. Thus, the frequency resource allocation unit of the sounding channel and that of the data transmission region are conformed. Also, in this case, however, a problem arises in that the legacy zone and the AAI zone are mixed by permutation.

3) When the AAI zone and the legacy zone are multiplexed in the FDM manner in the legacy support mode, a sounding channel is allocated as a subchannel unit by PUSC permutation defined by UL_Sounding_Command_IE in a subframe of the AAI zone. This may be applied to Sounding Command A-MAP IE. For example, a sounding type field may be added to Sounding Command A-MAP IE as shown in Table 3 below.

TABLE 3

| Sounding type | 1 | 0b0: for AAI only frame |
|---|---|---|
| | | 0b1: for AAI frame supporting legacy PUSC mode by FDM manner |

With reference to Table 3, a sounding channel allocation method varies according to the sounding type field. In case in which the sounding type field value is 1, when the AAI zone and the legacy zone are multiplexed in the FDM manner, a sounding channel is allocated to a subframe of the AAI zone. Here, the sounding subband bitmap field in Table 2 may indicate a logical index of DRU following the PUSC permutation. A start point of the logical index may be the smallest or the largest index of the overall bandwidth, or may be the smallest or largest index in a bandwidth occupied by the AAI zone. When this is specified, Sounding Command A-MAP IE may be expressed as shown in Table 4 below.

TABLE 4

| Syntax | Size (bit) | Notes |
|---|---|---|
| Sounding type | 1 | 0b0: for AAI only frame |
| | | 0b1: for AAI frame supporting legacy PUSC mode by FDM manner |
| If (Sounding type == 0b0) { | | |
| Sounding subband bitmap | variable max. 24 | FFT size dependant |
| } else { | | |

TABLE 4-continued

| Syntax | Size (bit) | Notes |
| --- | --- | --- |
| DRU offset | | DRU logical index that starts sounding |
| Number of DRUs | | Number of DRUs for sounding from DRU offset |
| } | | |

Alternatively, when the AAI zone and the legacy zone are multiplexed in the FDM manner in the legacy support mode, the BS may broadcast whether or not a corresponding subframe is a subframe of the AAI zone to a terminal. Here, when the corresponding subframe is a subframe of the AAI zone in the legacy support mode, the terminal may differently interpret the sounding subband bitmap field while using the existing Sounding Command A-MAP IE as it is. The sounding subband bitmap field may indicate a logical index of the DRU following the PUSC permutation.

Figure 11:
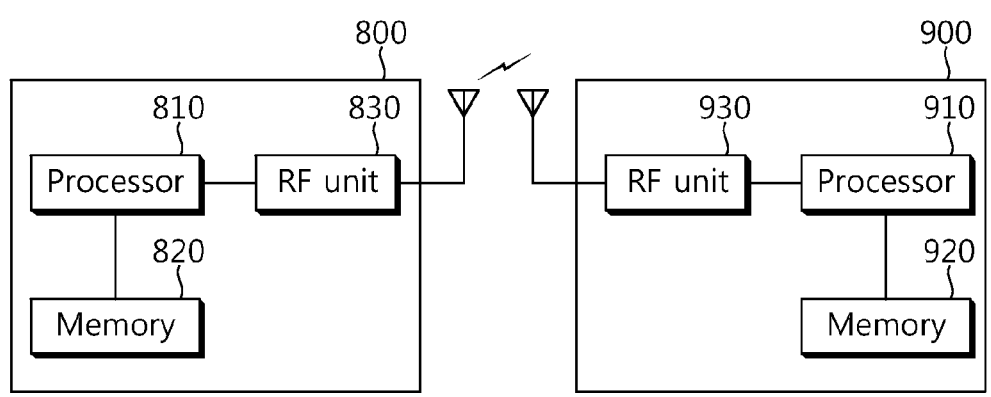
FIG. 11 is a block diagram showing a BS and a terminal implementing an embodiment of the present invention.

FIG. 11 is a block diagram showing a BS and a terminal implementing an embodiment of the present invention.

A BS 800 includes a processor 810, a memory 820, and an RF unit 830. The processor 810 implements a proposed function, process, and/or method. Layers of radio interface protocols may be implemented by the processor 810. The processor 810 may allocate a first sounding channel for a first system to a first zone by transmitting first sounding channel allocation information, and allocates a second sounding channel for a second system different from the first system to a second zone by transmitting second sounding channel allocation information. The first and second zones are multiplexed in the FDM manner, and the first and second sounding channels may be allocated to the same OFDMA symbol. The memory 820 is connected to the processor 810 to store various types of information for driving the processor 810. The RF unit 830 is connected to the processor 810 to transmit and/or receive a radio signal and transmit the feedback allocation A-MAP IE.

The terminal 900 includes a processor 910, a memory 920, and an RF unit 930. The RF unit 930 is connected to the processor 910 to receive sounding channel allocation information from the BS and transmit a sounding signal to the BS based on the sounding channel allocation information. The processor 910 implements a proposed function, process and/or method. Layers of radio interface protocols may be implemented by the processor 910. The memory 920 is connected to the processor 910 to store various types of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for allocating a sounding channel in a wireless communication system which supports a first system and a second system, wherein the first system is a legacy system and the second system is an advanced system of the first system, the method comprising:

transmitting first sounding channel allocation information for a first sounding channel for a first system;

transmitting second sounding channel allocation information for a second sounding channel for a second system;

allocating the first sounding channel for the first system to an orthogonal frequency division multiple access (OFDMA) symbol in a first zone for the first system based on a unit of a sounding subband using the first sounding channel allocation information; and allocating the second sounding channel for the second system to the OFDMA symbol in a second zone for the second system based on the unit of the sounding subband using the second sounding channel allocation information, wherein the first and second zones are multiplexed in a frequency division multiplexing (FDM) manner, and wherein the sounding subband includes 72 continuous subcarriers.

2. The method of claim 1, wherein the OFDMA symbol to which the first sounding channel and the second sounding channel are allocated is a first OFDMA symbol of an uplink subframe.

3. The method of claim 1, wherein the first sounding channel and the second sounding channel do not overlap in a frequency domain.

4. The method of claim 1, wherein the first system is an institute of electrical and electronics engineers (IEEE) 802.16e system, and the second system is an IEEE 802.16m system.

5. The method of claim 1, wherein the first sounding channel allocation information is UL_Sounding_Command_IE, and the second sounding channel allocation information is UL Sounding Command A-MAP IE.

6. The method of claim 5, wherein the UL_Sounding_Command_IE indicates a region to which the first sounding channel is allocated in the first zone, and the UL Sounding Command A-MAP IE indicates a region to which the second sounding channel is allocated in the second zone.

7. The method of claim 1, further comprising:
receiving sounding signals from the first sounding channel and the second sounding channel, respectively; and
measuring a channel response based on the received sounding signals.

8. An apparatus for allocating a sounding channel in a wireless communication system which supports a first system and a second system, wherein the first system is a legacy system and the second system is an advanced system of the first system, the apparatus comprising:
a radio frequency (RF) unit configured to transmit or receive a radio signal; and
a processor connected to the RF unit,
wherein the processor is configured to transmit first sounding channel allocation information for a first sounding channel for a first system, transmit second sounding channel allocation information for a second sounding channel for a second system, allocate the first sounding channel for the first system to an orthogonal frequency division multiple access (OFDMA) symbol in a first zone for the first system based on a unit of a sounding subband using the first sounding channel allocation information, and allocate the second sounding channel for the second system to the OFDMA symbol in a second zone for the second system based on the unit of the sounding subband using the second sounding channel allocation information,
wherein the first and second zones are multiplexed in a frequency division multiplexing (FDM) manner, and
wherein the sounding subband includes 72 continuous subcarriers.

* * * * *